Figure 1:
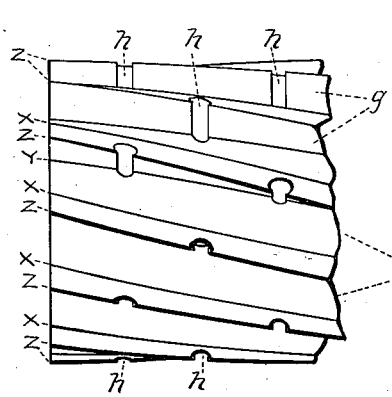

J. ERLANDSEN.
ROTARY CUTTER.
APPLICATION FILED DEC. 21, 1907.

960,526.

Patented June 7, 1910.

3 SHEETS—SHEET 1.

Witnesses:
Edwin R. Storm.
Oscar Erlandsen.

Inventor:
Julius Erlandsen.

J. ERLANDSEN.
ROTARY CUTTER.
APPLICATION FILED DEC. 21, 1907.

960,526.

Patented June 7, 1910.
3 SHEETS—SHEET 2.

Witnesses:
Edwin R. Storm
Oscar Erlandsen

Inventor.
Julius Erlandsen.

J. ERLANDSEN.
ROTARY CUTTER.
APPLICATION FILED DEC. 21, 1907.

960,526.

Patented June 7, 1910.

3 SHEETS—SHEET 3.

Witnesses:
Edwin R. Storm
Oscar Erlandsen

Inventor:
Julius Erlandsen

UNITED STATES PATENT OFFICE.

JULIUS ERLANDSEN, OF NEW YORK, N. Y.

ROTARY CUTTER.

960,526.

Specification of Letters Patent.

Patented June 7, 1910.

Application filed December 21, 1907. Serial No. 407,475.

*To all whom it may concern:*

Be it known that I, JULIUS ERLANDSEN, a citizen of the United States, residing in the city, county, and State of New York, have invented new and useful Improvements in Rotary Cutters, as set forth in the following specification.

The improvements relate to such rotary cutters as taps, reamers, milling cutters or other similar tools having generally longitudinal cutting edges, and the objects of the improvements are:—

First, to produce a rotary cutter having nicked cutting edges, by the use of an economical, practical and efficient method for forming such nicks, with cutting clearance given, in one operation, to both sides of the nicks, and thereby effecting a saving of power required to operate the cutter; owing to the little metal it is necessary to remove in order to form the desired nicks, the corners on the cutting edges, caused by such nicking, are well supported by the surrounding metal to overcome the strains and to absorb the heat due to the operation of the cutter. The nicks so formed will maintain their form and advantages unimpaired, through repeated grinding and remilling of the teeth.

Second, to produce a rotary cutter having means for lubrication, from an interior passage or chamber, whereby both the cooling and lubricating properties of the lubricating medium are utilized in the most efficient manner, by passing such medium through passages formed from points, at or near the cutting edges, through the thick portion of the teeth; in its outward flow, the lubricating or cooling medium absorbs the heat generated by the operation of the cutter and reduces to a minimum the expansion and distortion due to such heat; it is then discharged, where most required, at the cutting edges of the tool, in marked contrast with present methods of applying lubricants. Because of its flow from the center the lubricant is effective in dislodging chips from the channels between the teeth of the cutter. By facilitating the admission of heated gases to the heavy portions of the cutter, the lubricating passages promote the uniform heating of the tool for hardening, and they also favor the withdrawal of heat from the same portions during immersion of the tool in the hardening bath, thereby lessening the danger of rupture during this critical process.

Third, to combine the advantages of the passages and nicks, previously described, without the expenditure of additional labor over that required to form the lubricating passages. I accomplish this by locating the lubricating passages to nick the cutting edges.

For the better comprehension of the improvements the following description of a cutter is given. A rotary cutter, in general, comprises a body with projecting ridges or teeth formed by cutting channels, usually V shaped, in a longitudinal or spiral direction through the blank from which the cutter is made; these channels serve, also, for the disposition of the chips severed during the operation of the cutter. The contour of any tooth is formed by a working face which is usually approximately radial and is also one side of the channels mentioned; the working face is intersected, at the proper angle, by a back-face, the two faces forming the necessary cutting wedge and their line of intersection the cutting edge of the tooth: the contour is completed by the second side of the channels milled through the blank. Corresponding points on each tooth are concentric with the axis of rotation. To nick such a cutter it is the practice to form grooves at intervals, intersecting the teeth at right angles to the axis, extending from a channel to an adjoining channel dividing each tooth into a number of small isolated teeth which are ill designed to withstand the severe strains to which such a cutter may be subjected, especially if the grooves are of sufficient depth to endure repeated grindings. There is in general use another form of cutter known as an inserted tooth cutter to which the improvements are equally applicable.

Figure 2:
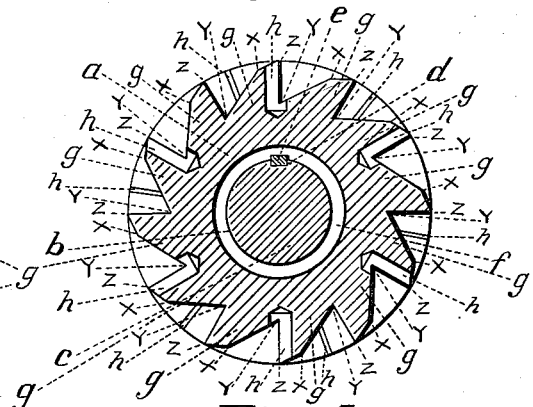
Figure 3:
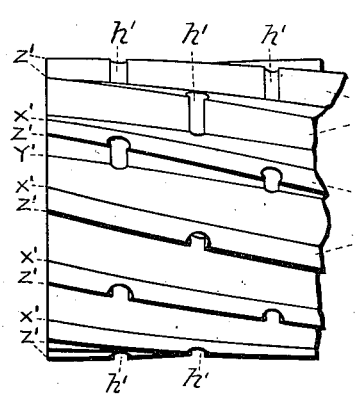
Figure 4:
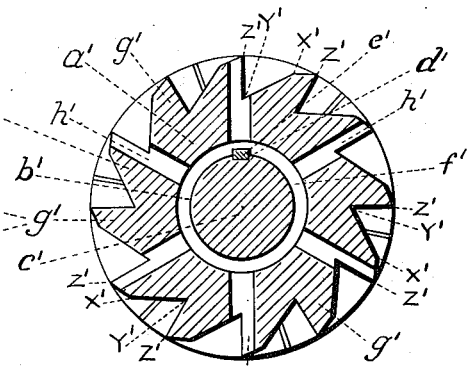
Figure 5:
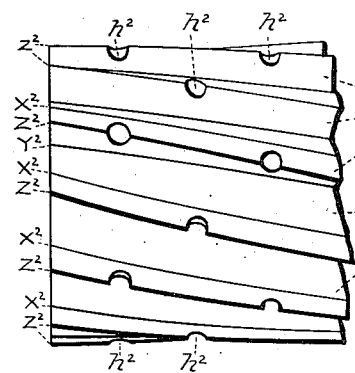
Figure 6:
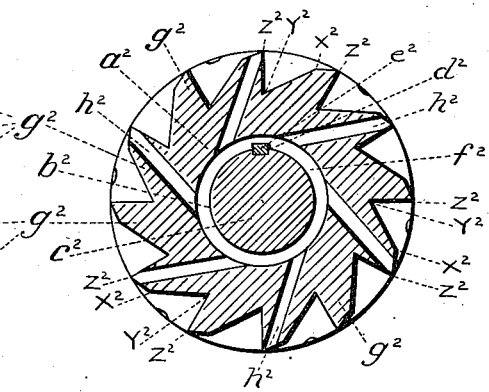
Figure 7:
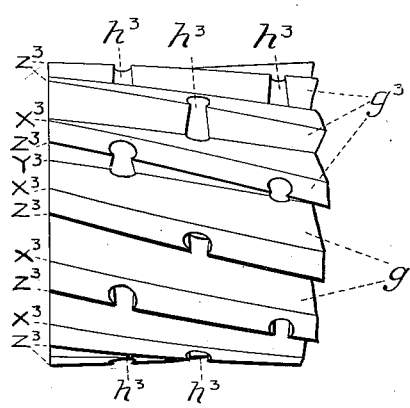
Figure 8:
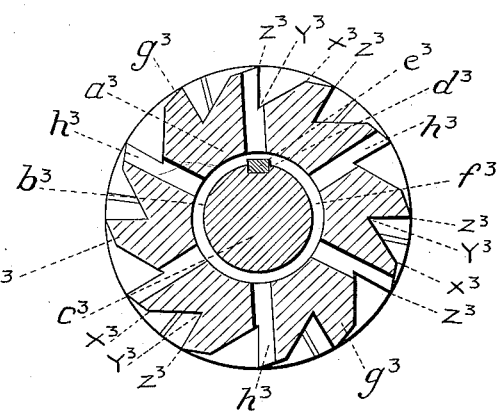
Figure 9:
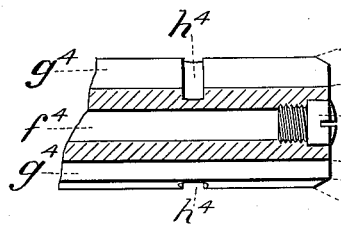
Figure 10:
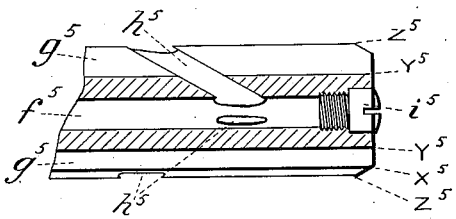
Figure 11:
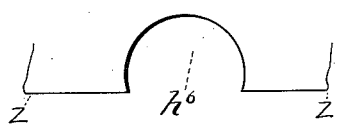
Figure 12:
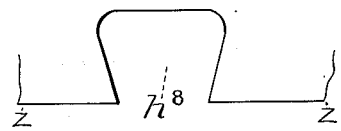
Figure 13:
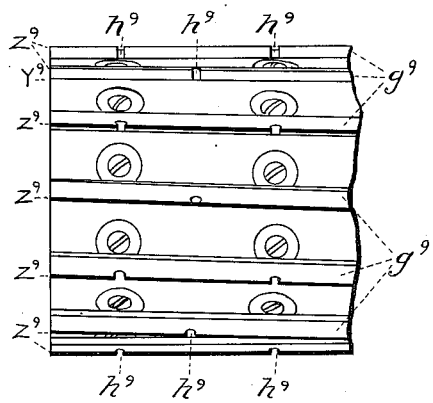
Figure 14:
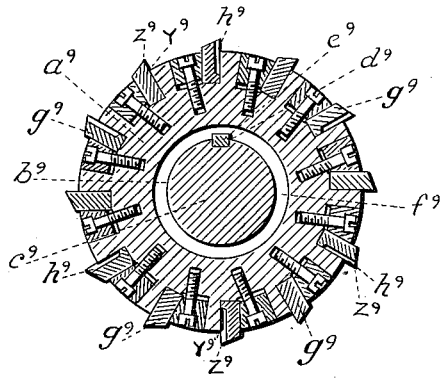
Figure 15:
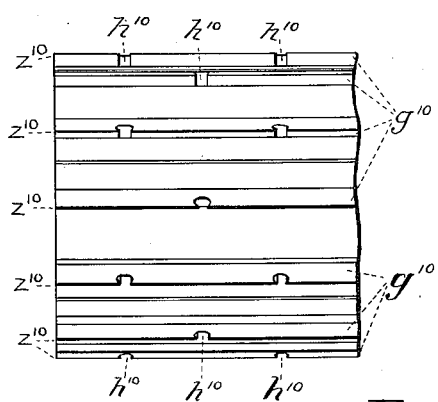
Figure 16:
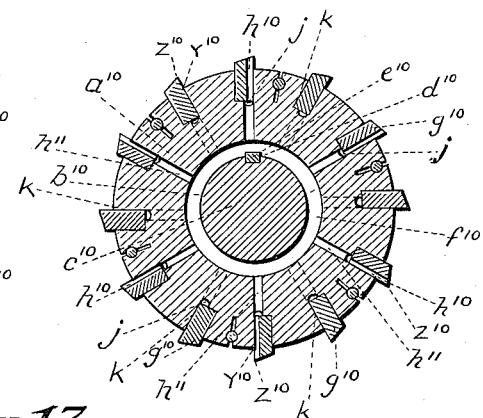
Figure 17:
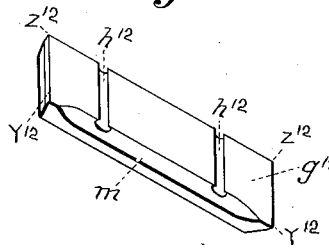
Figure 18:
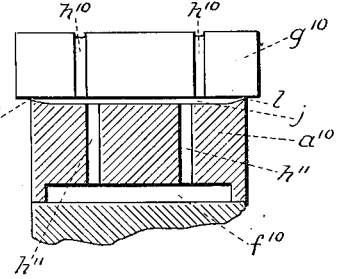

Figure 1 represents a face view of a portion of a rotary cutter showing nicks in the cutting edges formed by holes intersecting the working faces of the cutter. Fig. 2 represents a sectional view of Fig. 1, taken at right angles to the axis, showing the openings formed in the teeth of the cutter. Fig. 3 represents a face view of a cutter showing the relieved nicks in the cutting edges. Fig. 4 represents a sectional view of a rotary cutter, taken at right angles to the axis showing holes in the teeth which nick the cutting edges and communicate with the interior passage. Fig. 5 represents a face view of a rotary cutter having its cutting edges nicked by holes whose axes recede from the working face as they approach the center of the cutter: it shows the convergent apertures in the working face formed by such holes. Fig. 6 represents a sectional view of the cutter delineated by Fig. 5, such section being taken perpendicular to the axis of the cutter. Fig. 7 represents a face view of a cutter having its cutting edges nicked by holes with axes inclined toward the working faces as they approach the center of the cutter: it shows the divergent apertures in the working faces formed by such holes. Fig. 8 represents a sectional view of the cutter shown in Fig. 7, taken at right angles to the axis and indicates holes in the teeth which nick the cutting edges and communicate with an interior passage. Fig. 9 represents a longitudinal section of a rotary cutter through the working face, showing an interior passage and a removable plug closing the end of the passage, also the apertures formed in the working face by one form of nicking. Fig. 10 represents a longitudinal section of a rotary cutter through the working face showing an interior passage and inclined passages leading thereto; also the apertures formed in the working face by the inclined passages. Fig. 11 represents an enlarged view of one of the circular passages formed in the cutter. Fig. 12 represents an enlarged view of a general form of passage. Fig. 13 represents a face view of an inserted tooth cutter having its cutting edges nicked by holes. Fig. 14 represents a sectional view of the cutter shown in Fig. 13, taken at right angles to the axis and indicates the holes in the inserted teeth which nick the cutting edges. Fig. 15 represents a face view of an inserted tooth cutter having its cutting edges nicked by holes which communicate with holes in the body of the cutter leading to an interior passage. Fig. 16 represents a sectional view of the cutter shown in Fig. 15, taken at right angles to the axis and indicates holes in the inserted teeth which nick the cutting edges and communicate with an interior passage. Fig. 17 represents an isometrical view of one of the insertible teeth and shows the holes nicking the cutting edge and intersecting the working face, also a portion of one edge at the bottom removed to serve as a channel to distribute the lubricant. Fig. 18 represents a sectional view of a portion of the cutter taken on a radial plane coincident with the working face of a tooth shown in Fig. 16, and shows an inserted tooth with holes nicking the cutting edges, an interior passage, holes leading from the interior passage and a distributing channel.

Similar letters refer to similar parts throughout the several views.

In the cutter represented in Figs. 1 and 2, the body $a$ has a hole $b$ adapted to receive a mandrel $c$ upon which the cutter is mounted when in use; a key-seat $d$, to which the key $e$ is fitted; a chamber $f$, leaving a space between the body and the mandrel; teeth $g$, formed integrally with the body by milling through the blank, channels as $x$ $y$ $z$, whose sides $y$ $z$, are approximately radial working faces of the teeth, intersected by the back faces, $z$ $x$, the lines of their intersection $z$, being the cutting edges of the said cutter; the teeth are completed by the second sides of the channels, as $x$ $y$.

The improved method of nicking the cutting edges by forming holes $h$ in the teeth extending from the cutting edge $z$ and intersected by the working face $z$ $y$, causing apertures in this face is shown in Figs. 1, 2, 9, 13 and 14.

Where a combination of nicks and lubricating passages is desired, this may be effected, without additional labor over that required to form the lubricating passages, by locating the holes, $h^1$, so as to extend from the cutting edges, $z^1$, to the chamber $f^1$, and to be intersected by the working faces $z^1$ $y^1$, as shown in Figs. 3 and 4, also at $h^2$, Figs. 5 and 6; at $h^3$, Figs. 7 and 8; at $h^5$ Fig. 10; and at $h^{10}$ Figs. 15, 16, 17 and 18.

The passages may be inclined to the axis of the cutter as shown at $h^5$, Fig. 10. They are especially adapted to such forms of cutters as taps and reamers in which the cutting is done principally at one end and in which the chips may clog the channels and interfere with the proper working of the tool. By using passages inclined to the axis, the lubricant, flowing outwardly through these passages, $h^5$, and into the channels, forces the chips from the cutting portion of the teeth.

Where a hole to be operated upon by the cutter passes but partly through a body, or is bottomed, the screw $i$ may be removed allowing the oil when the cutter is working in the hole, to flow through the passage $f^4$ into the hole in which the cutter is working, fill it, and flow through the channels between the teeth $g^4$ carrying the chips with it, thus freeing the hole and cutter of chips leaving the edges free to cut. For such work the holes, $h^4$, nicking the cutting edges need not communicate with the interior passage, $f^4$, but terminate in the body of the cutter as indicated in Fig. 9.

It is not necessary that the holes which nick the cutting edges should be drilled so their axes coincide with radial lines of the cutter; they may be drilled, or otherwise formed at any angle desired as, for instance, that shown in Fig. 6 where the axes of the holes $h^2$, formed in the teeth $g^2$, diverge from the working faces as both advance into the cutter, or as in Fig. 8, where the axes of the holes $h^3$, formed in the teeth $g^3$, converge toward the working faces as both advance into the cutter. In the former instance convergent apertures will be formed in the working faces, in the latter instance divergent openings, i. e., such as are relieved both circumferentially and radially, will be formed, as shown in the respective drawings. This is also true of inserted tooth cutters, though in the drawing the holes are shown approximately parallel to the working face of the inserted tooth.

In Fig. 14 hole $h^9$ in the tooth $g^9$ does not pass quite to the lower edge of the tooth, but it nicks the cutting edge and intersects the working face thus performing all the functions of the hole $h$ shown in the tooth $g$ in Fig. 2.

In Fig. 16 the hole $h^{10}$ in the tooth $g^{10}$ passes to the bottom of the tooth where it communicates with a channel $j$, running lengthwise of the body of the cutter as shown at $j$, Fig. 18, from the channel $j$ holes $h^{11}$ communicate with the central passage $f^{10}$. By having the channel $j$ in the bottom of each of the grooves $k$ which retain the inserted teeth $g^{10}$, obviates any necessity of having the holes $h^{10}$ register with the holes $h^{11}$ in order to permit the lubricant to flow from the interior passage $f^{10}$ to the cutting edge $e^{10}$. By reducing the ends of the channel $j$ leaving smaller openings $l$ at each end the lubricant flows over the projecting ends of the inserted tooth $g^{10}$ thus cooling and clearing it of chips. This is shown more clearly in Fig. 18.

In Fig. 17 is shown an insertible tooth $g^{12}$ having a portion of the lower edge, $m$, removed by chamfering to serve as a channel in case no channel $j$ is formed in the bottoms of the grooves $k$. The ends of the chamfer $m$ are extended to predetermined points near the ends of the tooth $g^{12}$ so as to provide reduced openings similar to those shown at $l$, Fig. 18, when the tooth is inserted in the cutter.

All holes and passages previously described may be formed at right angles to the axis or inclined thereto, as shown at $h^4$, Fig. 9 and $h^5$, Fig. 10. Various outlines may be given to the holes, such outlines being immaterial, provided the hole widens from the aperture in the working face, as shown in Figs. 11 and 12. By varying the inclination of the hole with regard to the working face the aperture may be made to widen adaptably for a measurable distance from the cutting edge. Cylindrical holes being most economically formed and located are preferable. Where their axes are properly located such holes provide the necessary cutting clearance to the sides of the nicks without further manipulation. Owing to their location they do not appreciably diminish the strength of the teeth, and the cutting corners of the nicks are well supported to withstand the severe strains to which a nicked cutter is subjected: they are also better adapted to conduct from the cutting edge the heat generated by the operation of the cutter. The lubricant in its outward flow through these holes, to the cutting edges of the teeth, increases their efficiency, absorbs the heat generated by the operation of the cutter, and prevents expansion and distortion. During the hardening of the cutter these holes, $h^1$, $h^2$, $h^3$ and $h^5$, serve to conduct the heating medium to the thick portions of the cutter, thereby favoring the uniform heating so essential to proper hardening; they also serve, during the chilling process, to admit the chilling fluid to the same portions, favoring a rapid withdrawal of the heat and lessening the danger of rupture during this critical process.

By the methods of forming the passages set forth above, the cutter can be repeatedly re-ground or sharpened, and also re-milled, without removing the openings, or nicks in the working edges, or destroying the form of the passage.

Having described my invention, I claim and desire to secure by Letters Patent:—

1. In a rotary cutter having teeth, faces on the teeth and cutting edges at the intersection of the faces, the cutter being provided with holes intersecting the said faces and nicking the cutting edges.

2. In a rotary cutter having teeth with working faces; cutting edges on said teeth and having holes, extending from the periphery, intersected by the planes or surfaces of the working faces of the teeth, forming apertures in the said faces and nicks in the cutting edges.

3. In a rotary cutter having teeth with apertured working faces, said apertures caused by holes formed in the teeth intersecting the said working faces; such holes, when measured on the circumference of any intersecting cylinder concentric with the axis of the cutter, to widen for a measurable distance from the aperture.

4. A rotary cutter having teeth with faces and cutting edges and provided with holes having their axes approximately parallel to one of the faces; apertures formed by the said holes in the faces to which the axes are parallel; surfaces of the said holes that diverge from the said apertures and nicks in the cutting edges formed by the said holes.

5. A rotary cutter with working faces and cutting edges having an interior passage adapted to supply lubricant and provided with holes which nick the cutting edges, aperture the working faces and extend to the interior passage; the sides, of the holes, which intersect the working faces and limit the apertures therein, diverging from such apertures, substantially as shown and described.

6. In a rotary cutter provided with holes; teeth on the cutter; working faces on the teeth intersecting the holes, aperturing the said faces and nicking the cutting edges; and having one or more interior passages connecting with the said holes and adapted to convey lubricant thereto.

7. A rotary cutter having an interior channel, teeth with working faces on the said cutter; cutting edges on the said teeth; said teeth provided with holes extending from the periphery of the cutter to the said interior channel and intersected by the planes or surfaces of the working faces of the teeth forming apertures in the said faces and nicks in the cutting edges.

8. In a rotary cutter having teeth and provided with holes having their axes within the teeth; working faces on the teeth formed approximately parallel to the said axes and apertured by the said holes, such apertures measured on a line parallel with the axis of the cutter to be less than the diameter of the holes.

9. In a rotary cutter provided with circular holes; teeth on the cutter; back faces and working faces on the teeth intersecting the holes, forming apertures in the back faces and nicks in the cutting edges, such apertures to be less in width than the diameter of the holes.

10. In a rotary cutter having teeth provided with holes; working-faces on the teeth; such holes having their axes approximately parallel to and intersected by the said faces; cutting edges on the teeth nicked by the said holes; channels in the body of the cutter communicating with the holes in the said teeth; an interior passage adapted to supply lubricant communicating with the said channels.

JULIUS ERLANDSEN.

Witnesses:
EDWIN R. STORM,
ALFRED W. STORM.